US008363836B2

(12) United States Patent
Wing et al.

(10) Patent No.: US 8,363,836 B2
(45) Date of Patent: Jan. 29, 2013

(54) USING AUTHENTICATION TOKENS TO AUTHORIZE A FIREWALL TO OPEN A PINHOLE

(75) Inventors: Daniel G. Wing, San Jose, CA (US); David A. McGrew, Poolesville, MD (US); Cullen F. Jennings, Santa Cruz, CA (US); Eric G. Vyncke, Aleur (BE)

(73) Assignee: Cisco Technology, Inc., San Jose, CA (US)

( * ) Notice: Subject to any disclaimer, the term of this patent is extended or adjusted under 35 U.S.C. 154(b) by 772 days.

(21) Appl. No.: 12/355,153

(22) Filed: Jan. 16, 2009

(65) Prior Publication Data

US 2010/0183151 A1     Jul. 22, 2010

(51) Int. Cl.
*H04K 1/00* (2006.01)
(52) U.S. Cl. ........ 380/257; 713/153; 713/154; 709/227; 709/228
(58) Field of Classification Search ............... 380/255, 380/257, 278–285; 726/4, 5, 12, 13; 713/151, 713/162, 153–155; 709/227, 228
See application file for complete search history.

(56) References Cited

U.S. PATENT DOCUMENTS

| 4,677,612 | A | 6/1987 | Olson et al. | |
|---|---|---|---|---|
| 6,834,310 | B2 | 12/2004 | Munger et al. | |
| 6,842,860 | B1 | 1/2005 | Branstad et al. | |
| 6,971,028 | B1 | 11/2005 | Lyle et al. | |
| 6,996,070 | B2 | 2/2006 | Starr et al. | |
| 6,996,712 | B1 | 2/2006 | Perlman et al. | |
| 7,058,974 | B1 | 6/2006 | Maher, III et al. | |
| 7,139,679 | B1 | 11/2006 | McGrew | |
| 7,290,281 | B1 | 10/2007 | McGrew | |
| 7,925,554 | B1* | 4/2011 | Sirota et al. | 705/34 |
| 2006/0259492 | A1* | 11/2006 | Jun et al. | 707/9 |
| 2006/0259966 | A1* | 11/2006 | Ilnicki | 726/22 |
| 2007/0101414 | A1 | 5/2007 | Wing et al. | |

(Continued)

FOREIGN PATENT DOCUMENTS

| WO | 2004114631 | 12/2004 |
|---|---|---|
| WO | 2007053208 | 5/2007 |

(Continued)

OTHER PUBLICATIONS

M. Stiemerling, H. Tschofenig, C. Aoun and E. Davies, "NAT/Firewall NSIS Signaling Layer Protocol (NSLP); draft-ietf-nsis-nslp-natfw-20.txt", Internet Engineering Task Force, IETF; Standardworking Draft, Internet Society (ISOC), Geneva, Switzerland, vol. nsis, No. 20, Nov. 3, 2008.

(Continued)

*Primary Examiner* — Kim Vu
*Assistant Examiner* — Suman Debnath
(74) *Attorney, Agent, or Firm* — Patterson & Sheridan, LLP

(57) ABSTRACT

Techniques are described for the use of a cryptographic token to authorize a firewall to open a pinhole which permits certain network traffic to traverse firewalls. An initiating endpoint requests a token from a call controller, which authorizes a pinhole though the firewall. In response, the call controller may generate a cryptographic authorization token (CAT) sent towards the destination endpoint. The call controller may generate the token based on an authorization ID associated with the call controller, a shared secret known to both the call controller and the firewall, and data specific to the media flow for which authorization is requested.

20 Claims, 10 Drawing Sheets

U.S. PATENT DOCUMENTS

2009/0077248 A1* 3/2009 Castellucci et al. .......... 709/229
2009/0300723 A1* 12/2009 Nemoy et al. .................... 726/4
2010/0011103 A1* 1/2010 Luzzatti et al. ............... 709/226

FOREIGN PATENT DOCUMENTS

WO 2008045581 4/2008

OTHER PUBLICATIONS

PCT International Search Report and Written Opinion dated Apr. 12, 2010 for application No. PCT/US2009/069044.

A Juels et al., "Client Puzzles: A Cryptographic Countermeasure Against Connection Depletion Attacks," in S. Kent, editor, Proceedings of NDSS '99 (Networks and Distributed Security Systems), pp. 151-165, 1999.

D. Dean et al., "Using Client Puzzles to Protect TLS," 10th Annual USENIX Security Symposium, 2001.

S. Kent et al., "Security Architecture for the Internet Protocol," IETF RFC 2401, Nov. 1998, pp. 1-66.

Cisco Systems, Inc., "IPSec," Jan. 1997, pp. 1-10.

* cited by examiner

USING AUTHENTICATION TOKENS TO AUTHORIZE A FIREWALL TO OPEN A PINHOLE

BACKGROUND

1. Technical Field

Embodiments described in this disclosure generally relate to network security and, more particularly, to using authentication tokens to authorize a firewall to open a pinhole.

2. Description of the Related Art

As is known, RTP (short for real time protocol) provides an internet-standard protocol for transporting real-time media data, such as streaming audio and video, e.g., a VoIP telephone call. Of course, other protocols are available to create and manage media flows over computer networks. A common approach for allowing such media to flow over a firewall is for the firewall to inspect signaling messages (e.g., SIP) to identify information regarding what IP addresses and ports the media is going to use for a data flow (e.g., RTP over UDP). Once identified, the firewall opens a "pinhole" which allows the media to flow through that firewall towards an intended destination (provided the destination addresses and/or ports are authorized to receive such traffic). However, if the signaling is encrypted (which, it frequently is), the firewall cannot inspect the substance of the signaling to identify the destination addresses and/or ports.

Further, if the signaling and the actual media flow traverse different paths through a network, there is no way to guarantee that the firewall that actually receives the media will understand that a pinhole should be opened for such traffic. This latter scenario may be addressed by constraining network design to force signaling and media to flow through the same firewall. However, this approach often leads to unnatural network design choices in order to force both message signaling and subsequent real time data flows to use the same network paths. Accordingly, there remains a need for techniques for using authentication tokens to authorize a firewall to open a pinhole for certain media flows; in particular, to open a pinhole for media flows carrying real-time streaming media data (e.g., a VoIP call transported using RTP over UDP).

SUMMARY

Embodiments described in this disclosure generally provide methods and apparatus for using authentication tokens to authorize a firewall to open a pinhole. One embodiment described herein includes a system. The system may generally include a network device having a processor and a memory containing a program. The program may generally be configured to receive a message used to authorize a media flow which traverses the network device towards a destination endpoint. The request itself may include a cryptographic authorization token (CAT) and flow data describing a source endpoint and a destination endpoint for the media flow. The network program may be further configured to evaluate the CAT to determine whether the CAT was generated by an authorized call controller. The evaluation is based, at least in part, on a shared secret known to both the network device and the authorized call controller. Upon determining that the CAT was generated by the authorized call controller, a pinhole is opened by the network device, allowing network traffic from the source endpoint to pass through the network device towards the destination endpoint.

In a particular embodiment, the message may further include a pseudo-time indicating when the CAT was generated, a keep-alive frequency period, and a CAT lifetime period specified relative to the pseudo-time. Further, the network device may require that a keep-alive message be received within each successive keep-alive frequency period after the pinhole is opened in order for the pinhole to continue to remain open, up to the duration of the CAT lifetime period (also determined relative to the pseudo-time). Further still, the call controller which generated the CAT authorizing the firewall to open a pinhole may also be configured to delegate authority to a trusted relay point (TRP) to keep a specific pinhole open up to the lifetime of a given CAT. For a call to remain active beyond this period, the TRP may request a new CAT from the call controller, prior to the expiration of the initial CAT, and forward it toward the endpoint. Both the CAT and the keep-alive messages are transmitted over a network as Session Traversal Utilities for NAT (STUN) messages.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
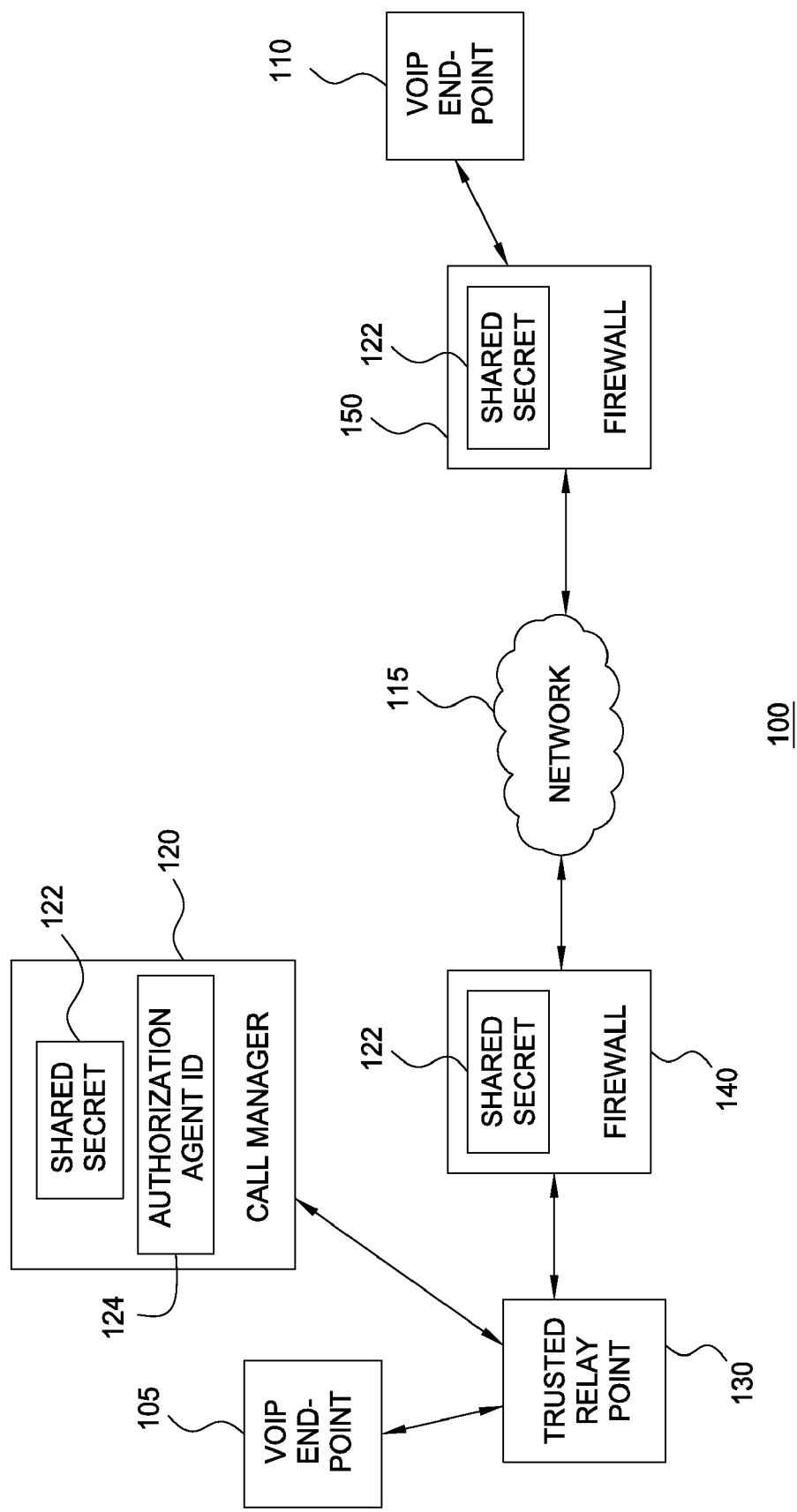
FIG. 1 illustrates an example network topology, according to an embodiment in the present disclosure.

The present disclosure describes the use of a token generated to authorize a firewall to open a pinhole which permits certain network traffic to travel through the firewall, e.g., RTP over UDP used for a real-time media flow. Using a VoIP call as an example, an initiating VoIP endpoint requests a token from a call controller which authorizes a pinhole though the firewall prior to establishing a call to a destination VoIP endpoint. In response, the call controller may generate a token that will be sent towards the destination endpoint. The call controller may generate the token based on an authorization ID associated with the call controller, a shared secret known to both the call controller and the firewall, and data specific to the media flow for which authorization is requested. In one scenario, the initiating VoIP endpoint receives the token from the call controller and forwards it towards the destination. Alternatively, a trusted relay point (TRP) may request the token from the call controller and send it toward the VoIP destination endpoint on behalf of the initiating VoIP endpoint. This latter approach allows for the token to be used to authorize a firewall pinhole without also requiring software on individual VoIP phones to be modified.

Once authorized, the pinhole may be kept open using keep-alive messages sent from the initiating VoIP endpoint (or the TRP). Further, the token itself may have a maximum life time after which a new token must be requested form the call controller (and transmitted toward the destination VoIP endpoint) for the pinhole to remain open. Further still, after opening a pinhole, the firewall may remember the pseudo-time used to open that pinhole, and that pseudo-time cannot be reused to open another pinhole through that firewall, or through any other firewall that has seen that pseudo-time or larger pseudo-time.

The pseudo-time itself may provide a clock value synchronized among the call controller and a firewall(s). Further, the pseudo-time in a CAT token is needed only for processing that CAT token and corresponding pinhole firewall. That is, the pseudo-time need not correspond to any other system clock, and it need not proceed at the same rate as any other clock. In one embodiment, the pseudo-time may be implemented using a monotonically increasing value (e.g., a 48 bit value were lower 32 bits are initialized to zero when a given media flow is initialized and the upper 16 bits are incremented anytime a call controller is restarted). In addition to sharing a synchronized clock value, a validity period may be defined which indicates the number of pseudo-time units that a CAT should be considered valid after it has been issued.

One embodiment disclosed herein may be implemented as a routing program executing on a network device, e.g., a firewall or a router, configured to shield a network from malicious (or simply unwanted) network traffic. Additionally, embodiments disclosed herein may be adapted for use by other network devices, e.g., a "transparent" firewall acting as a network bridge. Additionally, the routing program may be distributed on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks.

FIG. 1 illustrates an example network topology 100, according to an embodiment in the present disclosure. In this example, network topology 100 is used to initiate (and maintain) a call between a first VoIP endpoint 105 (initiating a VoIP call) and a second VoIP endpoint 110 (the destination of the call). The first VoIP endpoint 105 may provide either a hardware or software based IP-phone allowing a user to place (and receive) telephone calls. Of course, one of ordinary skill in the art will recognize that the techniques described herein for using authentication tokens to authorize a firewall to open a pinhole may be adapted for use with a variety of call controllers, call managers or other media managers configured to authorize real-time data and/or media flows in addition to the use of an RTP over UDP flow used to conduct a VoIP call, as shown in the Example of FIG. 1.

As shown, the first VoIP endpoint 105 is located behind a firewall 140 along with a trusted relay point (TRP) 130 and a call controller 120 (or more generally, a call manager configured to authorize a variety of different real-time media flows). Similarly, the second VoIP endpoint 110 is located behind a firewall 150. Accordingly, data packets carrying a voice call must traverse through the firewall 140 and the firewall 150 to reach the second VoIP endpoint 110. Typically however, firewall 140 may be configured to allow outbound traffic to flow towards network 115. In contrast, the firewall 150 must allow the incoming traffic to pass through the firewall 150 in order for the first VoIP endpoint 105 to place a call to the second VoIP endpoint 110. Firewall 140, 150 may comprise any suitable routing or network device having a processor and a memory storing a routing program configured to allow, block, or route traffic through the firewall towards a destination endpoint behind the firewall As described in greater detail below, the call controller 120 may provide a network device configured to generate an authorization token, referred to as a cryptographic authorization token (or CAT for short) used to create a firewall pinhole authorizing such traffic. Thus, the call controller 120 acts as an authorization agent for calls placed by first VoIP endpoint 105.

Illustratively, the call controller 120 and the firewalls 140 and 150 each know a shared secret 122. The shared secret 122 may be based on the authentication-agent-id 124 used to identify a given call controller 120. As described in greater detail below, the call controller 120 may use the shared secret 122 and the authentication-agent-id 124, along with call-specific data to create the CAT authorizing firewall 150 to open a pinhole. In turn, the firewall 150 may use the authentication-agent-id 124 and its copy of the shared secret 122 to authenticate that a CAT came from a given call controller 120.

Further, a pinhole opened by firewall 150 may be configured to remain open for only a predefined period of time. That is, the CAT may authorize a pinhole with a limited lifetime. Further still, during that period, the firewall 150 may be configured to require that a new authenticated keep-alive message be sent every so often (e.g., every 30 seconds) in order for the pinhole to remain open. In the example topology of FIG. 1, authenticated keep-alive messages may be generated by the TRP 130. Thus, while the call controller 120 creates the CAT authorizing (and re-authorizing) a pinhole through firewall 150, the call controller 120 delegates authority to the TRP 130 to keep a specific pinhole open up to the lifetime of a given CAT. For a call to remain active beyond this period, the TRP 130 may request a new CAT from the call controller, prior to the expiration of an initial CAT, and forward it toward the endpoint.

Figure 2:
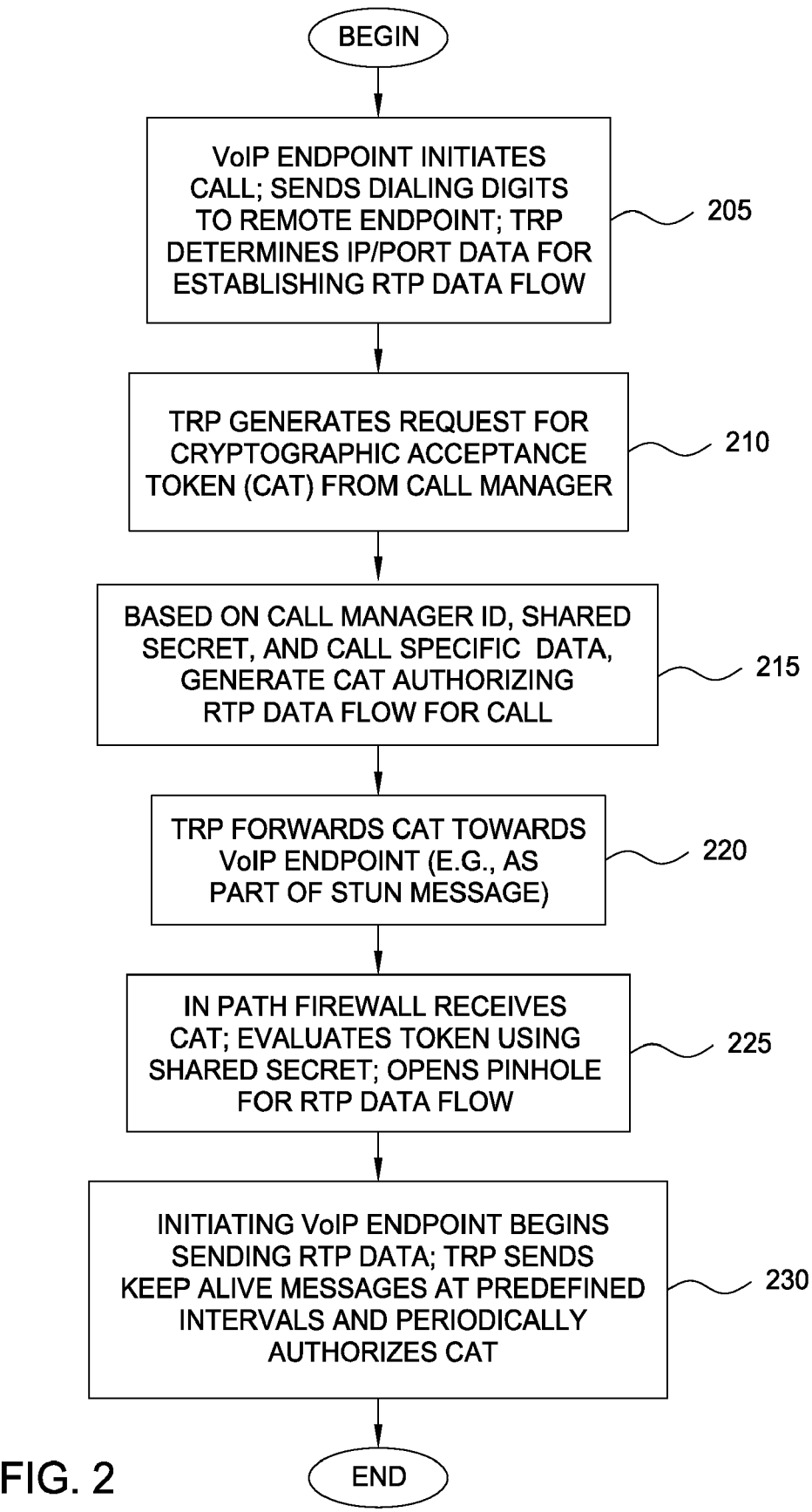
FIG. 2 is a flow chart illustrating an example method for using authentication tokens to authorize a firewall to open a pinhole, according to an embodiment in the present disclosure.
Figure 4A:
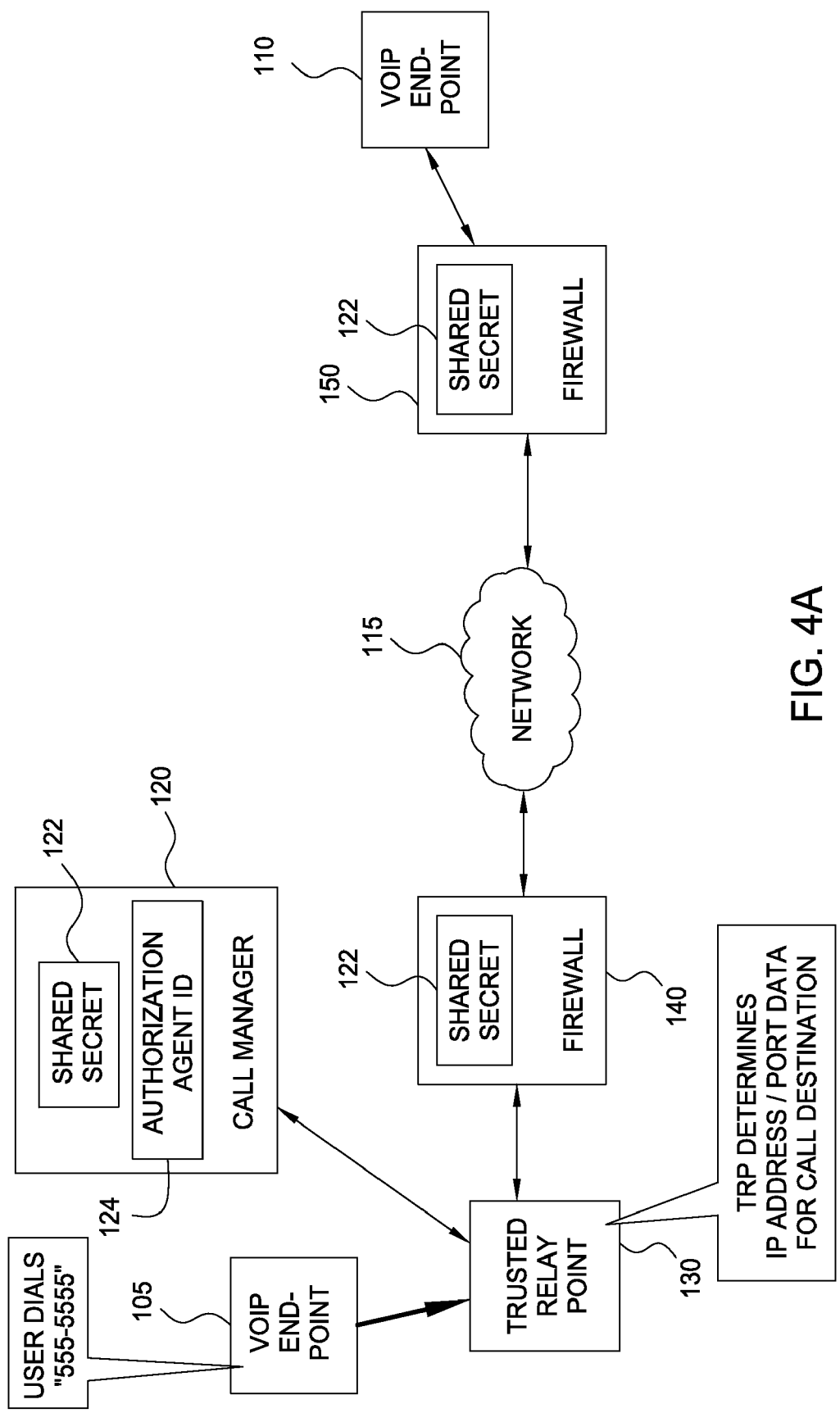
FIGS. 4A-4E illustrate network traffic flow using authentication tokens to authorize a firewall to open a pinhole in the example network topology of FIG. 1, according to an embodiment in the present disclosure.

FIG. 2 is a flow chart illustrating an example method 200 for using authentication tokens to authorize a firewall to open a pinhole, according to an embodiment in the present disclosure. The method 200 of FIG. 2 is described in conjunction with FIGS. 4A-4E, which provides an example of traffic flow using the network topology of FIG. 1. As shown, the method 200 begins at step 205, where a VoIP endpoint initiates a voice call. This is illustrated in FIG. 4A where the VoIP endpoint 105 is used to dial a phone number ("555-5555"). In response, the TRP 130 receives a request to place a call to the dialed digits and resolves a destination IP address and port of the VoIP endpoint 110.

Figure 4B:
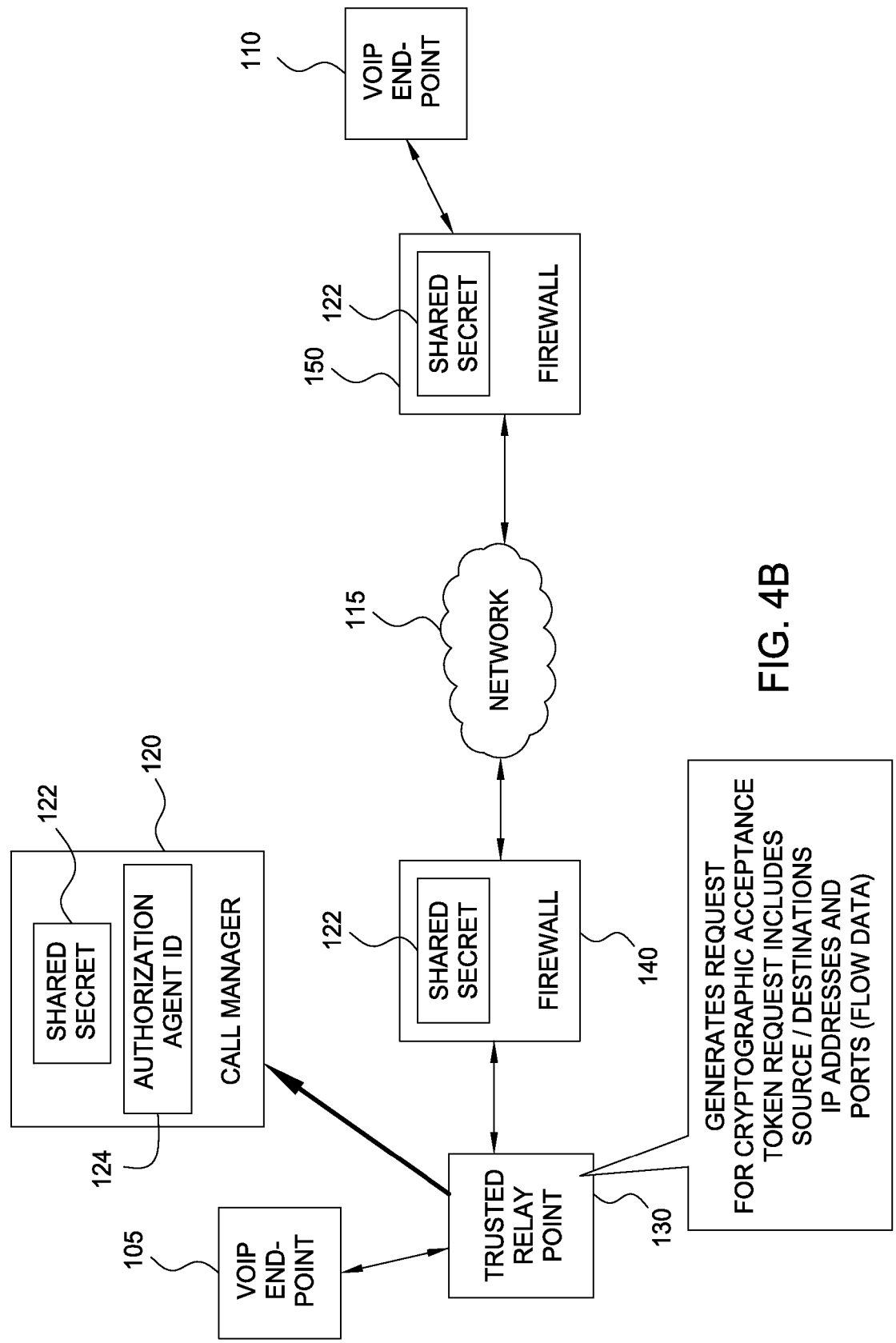

At step 210, the TRP generates a request for a CAT from the call controller. For example, FIG. 4B shows TRP 130 sending a request for a token authorizing a firewall pinhole. The request may include the destination IP address and port determined at step 205, a source IP address and port for the VoIP endpoint 105 seeking to initiate the voice call, as well as a pseudo-time reflecting when the CAT was generated. As stated, the pseudo-time may reflect a monotonically increasing value used to ensure that a token has a limited validity. Thus, an otherwise valid CAT presented to a firewall with a pseudo-time outside the validity period cannot be used to open a pinhole. That is, a CAT cannot be intercepted and reused outside of the validity interval. In response, at step 215, the call controller may generate a CAT token authorizing an in-path firewall to open a pinhole—allowing media to traverse that firewall towards a destination.

Figure 4C:
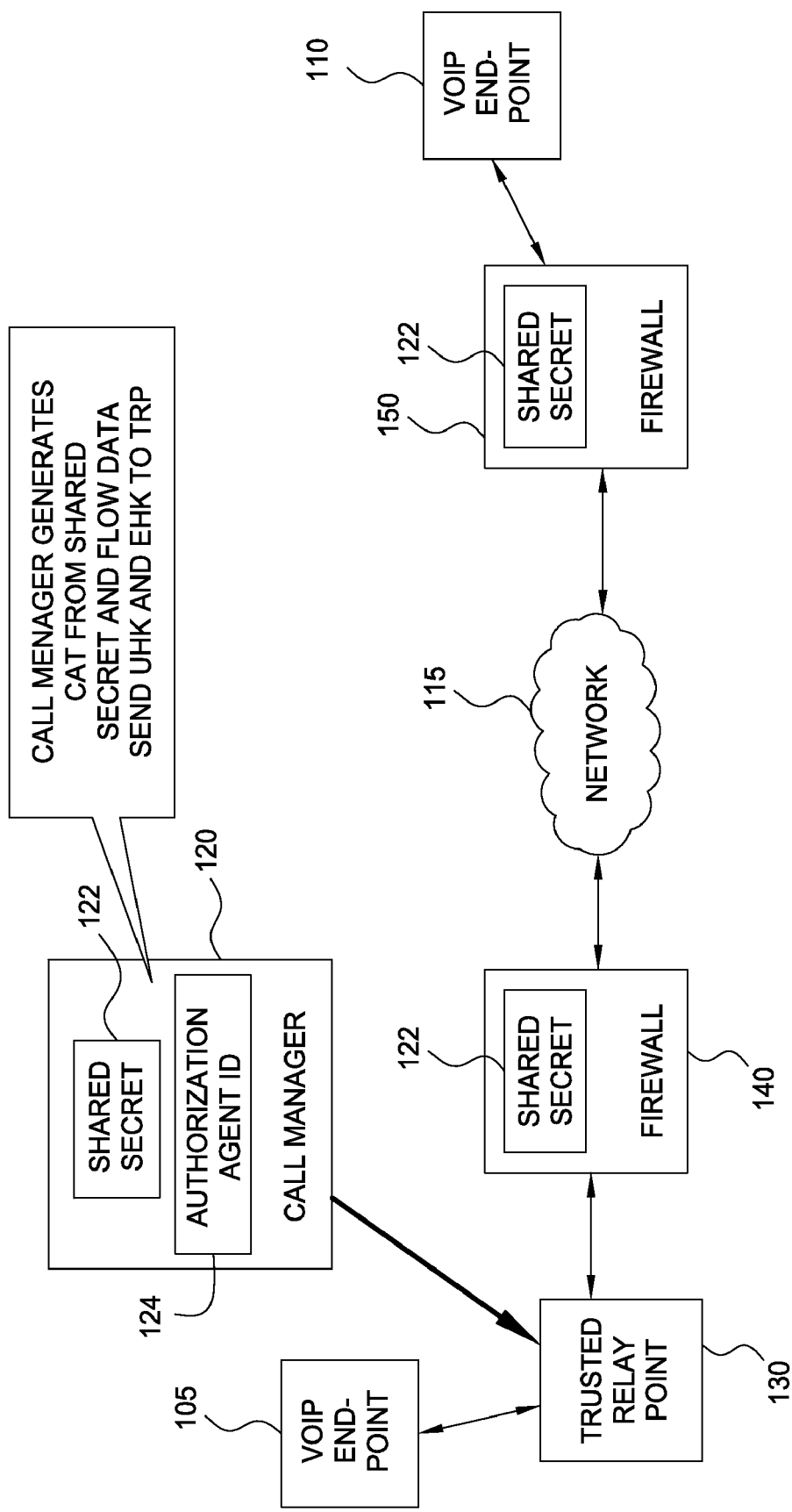

For example, FIG. 4C shows the call controller 120 generating the CAT from certain information, including the shared secret 122. Additionally, FIG. 4C shows the call controller sending an unencrypted HMAC Key (UHK) and an encrypted HMAC key (EHK) as part of the response to the request from the TRP 130 for a CAT. As one of ordinary skill in the art will recognize, a keyed hash message authentication code (HMAC) is a type of message authentication code (MAC) calculated using a cryptographic hash function in combination with a secret key.

As stated above, the call controller may be configured with a shared secret 122 and an authentication-agent-id 124 and this information may be shared with firewalls in a common administrative domain (e.g., Firewalls 140, 150). That is, each firewall allowing pinholes based on a CAT is supplied with an authorization-agent-id 124 (per call controller) and the shared secret 122. The authorization-agent-id 124 and the shared secret 122 allow the firewall to authenticate that messages have been originated by a given call controller. At the same time, the shared secret 122 is not shared with the TRP 130 or the VoIP endpoints 105, 110.

From the shared secret 122, both the call controller 120 and firewall 150 perform a key derivation function. For example:

$K_{mac}$=HMAC-SHA1-128 ("MAC", shared secret)
$K_{enc}$=HMAC-SHA1-128 ("KEY", shared secret)

The $K_{mac}$ is used to authenticate the CAT, which is used to open the firewall pinhole. In this example, the $K_{enc}$ provides a 128-bit encryption key for creating the EHK, which is used to keep the pinhole alive. The "MAC" supplied to calculate $K_{mac}$ may be determined from the flow data particular to a requested media flow. Note, however, neither of these values ($K_{mac}$ and $K_{enc}$) is sent over the network. Instead, the call controller 120 and the firewall 150 calculate them internally using the shared secret 122.

Thus, the call controller 120 is configured with the shared secret 122 and generates both a UHK and an EHK—per call. That is, on a per-call basis, the call controller 120 generates the CAT for the TRP 130. The CAT allows a firewall (e.g., firewall 15) to authenticate flow data describing a media flow (e.g., a set of source and destination addresses, communication protocols and call specific attributes). The TRP 130 does not have the HMAC key (i.e., $K_{mac}$) necessary to generate CAT; instead, it may be supplied by the call controller 120. The call controller 120 may be configured to do this at the beginning of each call and at the end of the call (for a "close pinhole" message). Further, the call controller 120 also generates a new CAT for every CAT-duration period (e.g., every 5 minutes) that a call is active.

In one embodiment, the call controller 120 relays this information to the TRP 130, which learns the UHK and a CAT lifetime (i.e., the duration for which a pinhole may be opened using the CAT). The EHK is also relayed to the TRP 130, however, the EHK is not used by the TRP 130 directly. Instead, the EHK is included in messages sent towards the VoIP endpoint 110 and is seen by any in-path firewalls (e.g., firewall 150).

Figure 4D:
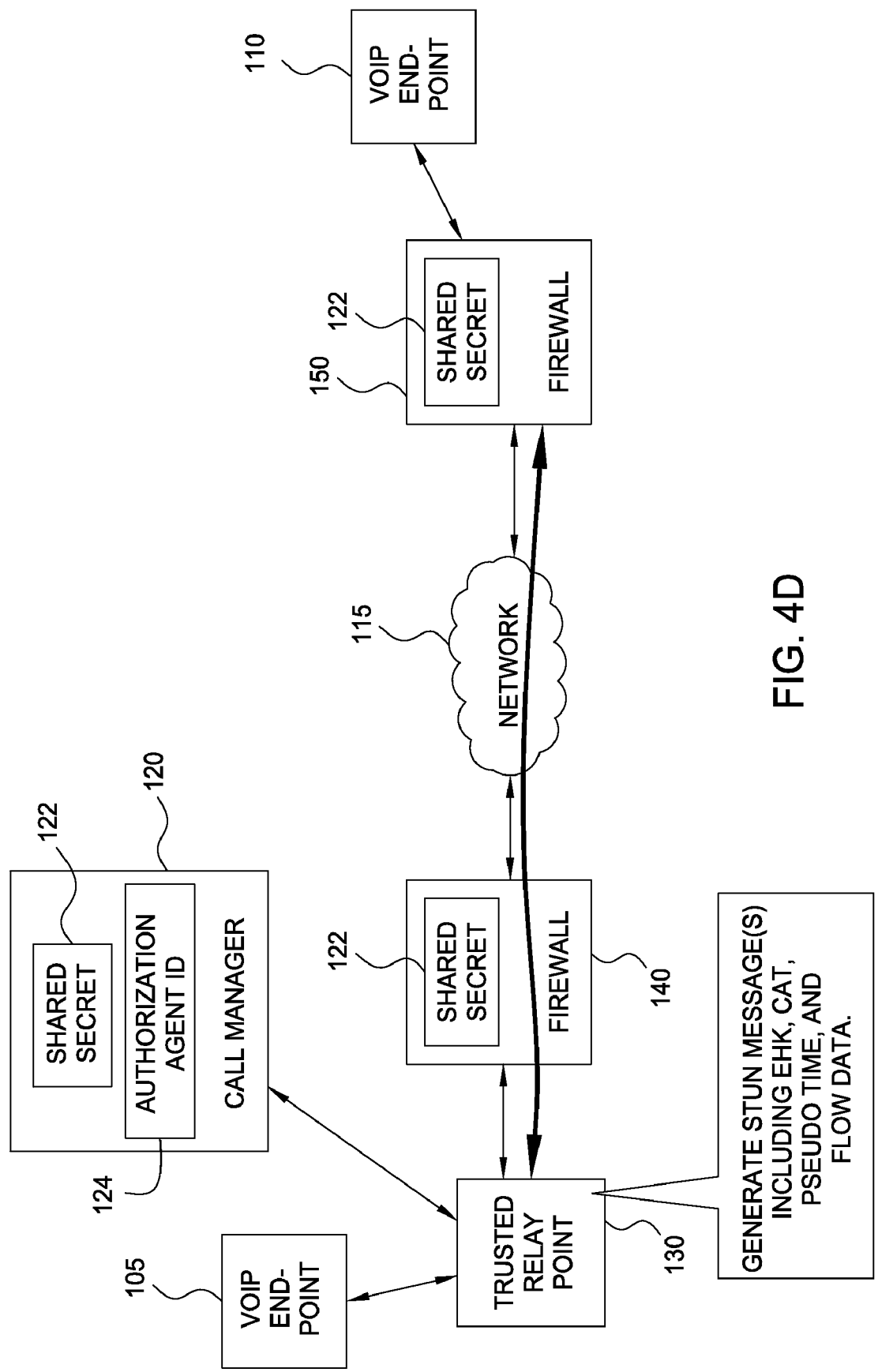
Figure 4E:
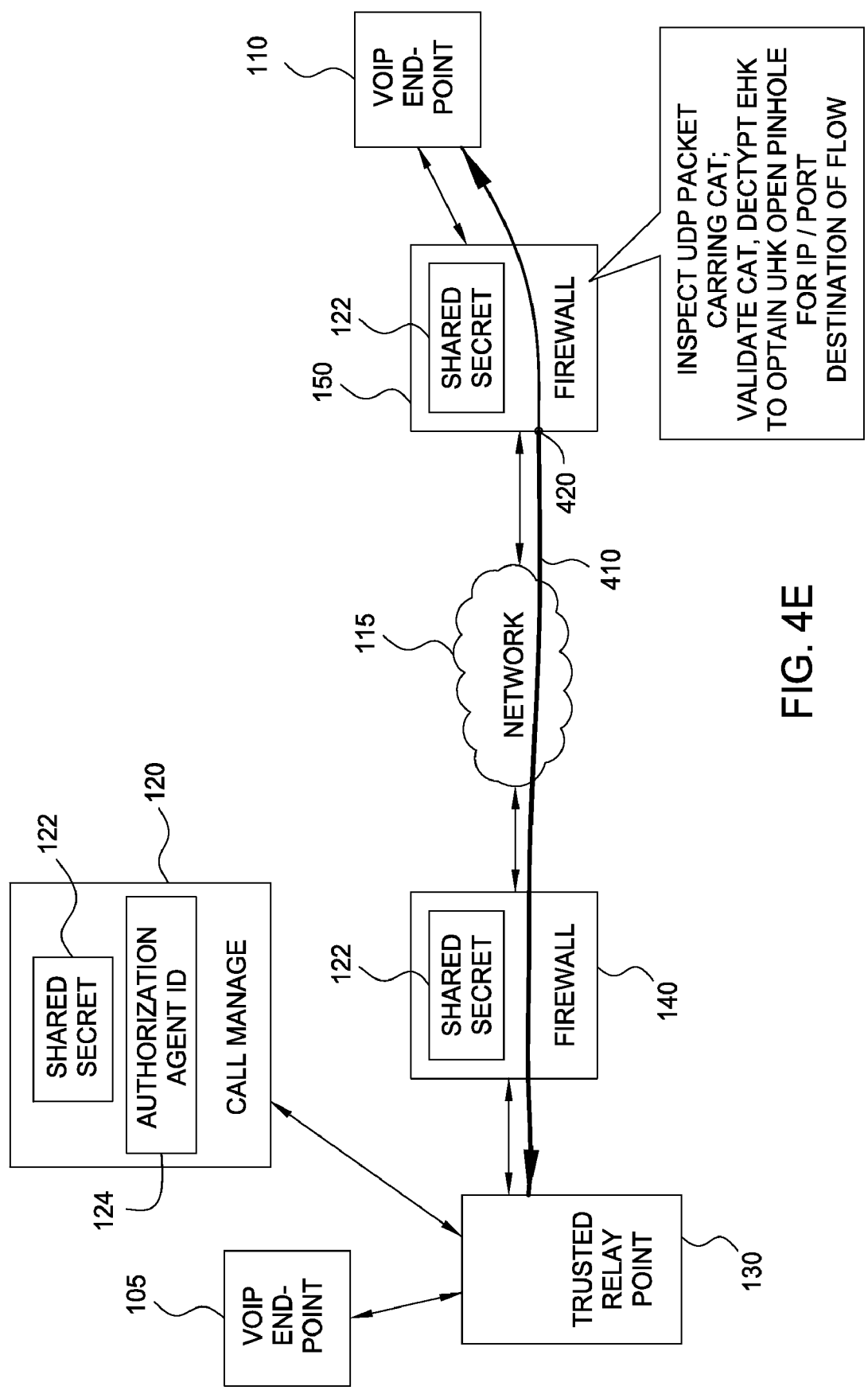

Returning to the method 200 of FIG. 2, at step 220, the TRP may forward the CAT towards a VoIP endpoint. In one embodiment, the CAT (including the EHK value) may be relayed as part of a Simple Traversal of UDP NAT (STUN) message. For Example, FIG. 4D shows an example of TRP 130 generating a STUN message which includes the EHK, the CAT, a pseudo-time and the media flow data. As stated, the message sent toward the VoIP endpoint 110 may also include a validity period (determined relative to the pseudo-time) and a keep alive frequency, indicating how often keep-alive messages should be sent to keep a pinhole open based on a given CAT. At step 225, an in-path firewall identifies the messages sent from the TRP and evaluates the information included in the message. Provided the CAT is authenticated, the firewall then opens a pinhole for a media flow identified in the flow data included with the CAT (e.g., flow data communicated as fields in a STUN message). For example, FIG. 4E shows the firewall 150 opening a pinhole 420 to authorize media flow 410. In one embodiment, firewall 150 (which knows the shared secret 122) decrypts the EHK to determine a corresponding UHK. The firewall uses this UHK to authenticate the request to open a pinhole. For example, the firewall 150 may use the shared secret 122 to independently calculate a value for UHK, by comparing this value with the UHK determined by decrypting EHK received from TRP 130, the firewall 150 may confirm that the request came from call controller 120. In such a case, firewall 150 opens the pinhole 420.

Additionally, the pseudo-time from the CAT is evaluated to verify that the CAT was issued within the validity period. If it was, then the firewall 150 returns an indication that the CAT is accepted, i.e., an indication that the firewall 150 has opened a pinhole corresponding to the CAT. In one embodiment, if the pseudo-time in the CAT is ahead of the local pseudo-time at the firewall 150, then the local pseudo-time is advanced to the value of the pseudo-time in the CAT and the token is accepted. Of course, a media flow is opened after validating the CAT at step 225, can persist long after the validity period expires; the validity period only determines the allowed length of time during which the CAT may be used to open a pinhole.

At step 230, once a pinhole is authorized, the initiating VoIP endpoint begins sending data over the authorized media flow, e.g., an RTP over UDP flow sent to/from the source and destination addresses and ports of VoIP endpoints 105 and 110. As packets traverse network 115 and encounter firewall 150, pinhole 420 allows such traffic to flow towards destination endpoint behind the firewall (e.g., VoIP endpoint 110).

Figure 3:
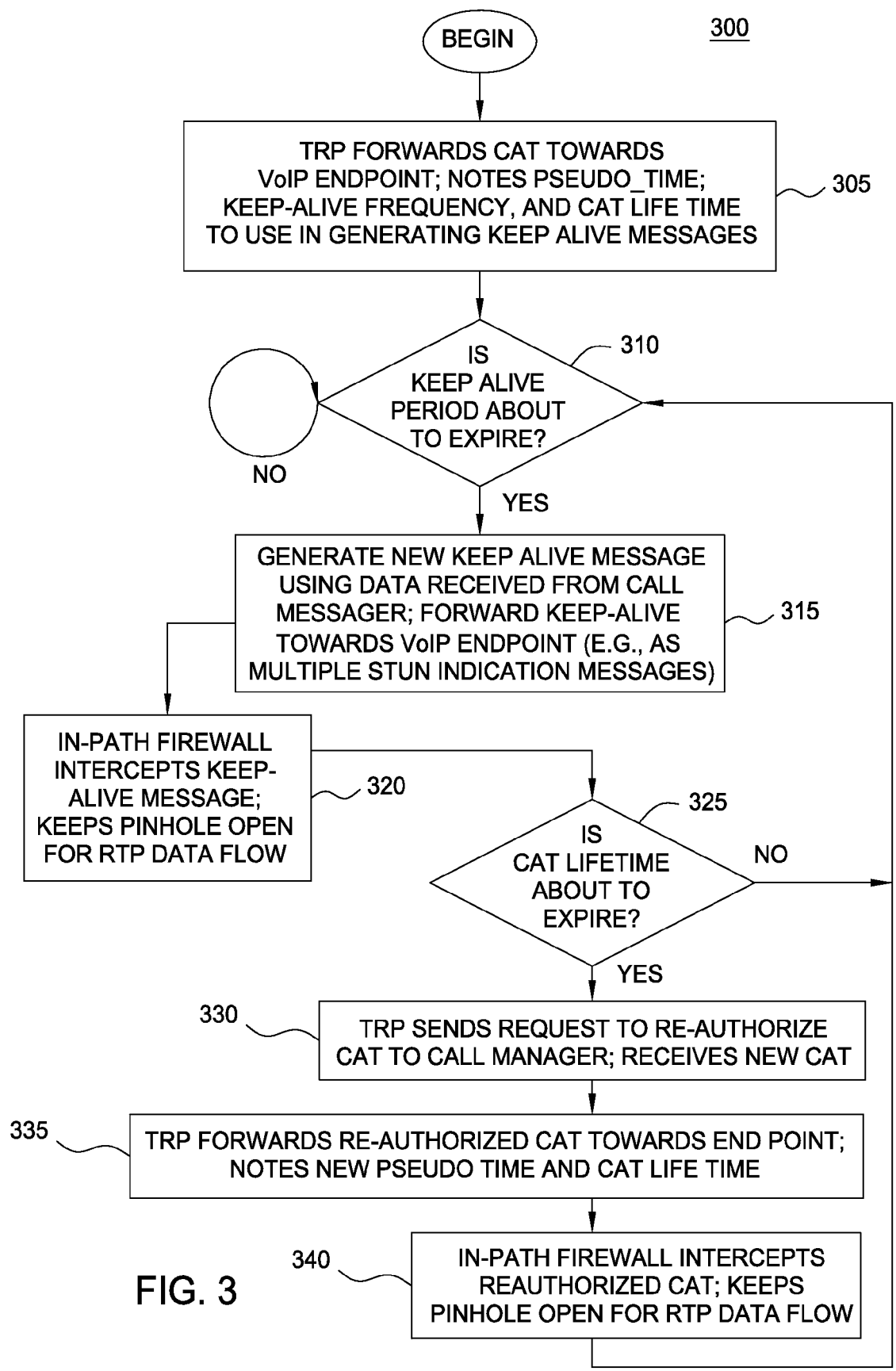
FIG. 3 is a flow chart illustrating an example of a method for maintaining a pinhole carrying a media flow using keep-alive messages, according to an embodiment in the present disclosure.

As stated, the CAT message used to authorize a firewall to open a pinhole may have a predefined lifetime, relative to a pseudo-time at which a call controller generated the CAT for a given call. Further, during that lifetime, a firewall may require that keep-alive messages be received every so often for the duration of a media flow (e.g., every thirty seconds for a VoIP call sent using UDP over RTP). FIG. 3 is a flow chart illustrating an example of a method 300 for maintaining a pinhole carrying a media flow using keep-alive messages, according to an embodiment in the present disclosure. The method 300 of FIG. 3 is described in conjunction with FIGS. 4F-4G, which provide an example of traffic flow used transmit using keep-alive messages in the example network topology of FIG. 1.

As shown, the method 300 begins at step 305 where the TRP forwards a CAT towards a VoIP endpoint as described above. Additionally, the TRP may note the pseudo-time, the keep-alive frequency to use in generating keep-alive messages, and a CAT lifetime used to determine when to request a reauthorization of the CAT, if necessary. As described, once the TRP sends the CAT towards a destination and a pinhole is opened traversing an in-path firewall, data packets may be sent towards the destination as part of a media flow, e.g., RTP over UDP packets carrying media for a VoIP call. Of course, other real-time protocols and data flows may be sent.

At step 310, the TRP monitors how much time has elapsed, relative to the pseudo-time of the CAT, until a current keep-alive period is about to expire. For example, for a keep-alive period of 30 seconds, the TRP may wait until five seconds prior to the expiration of the current 30-second window before sending a keep-alive message towards the endpoint. Of course, the keep-alive period and time at which new keep-alive messages are sent may be tailored to suit the needs in an individual case. At step 315, once the keep-alive period is about to expire, the TRP may determine whether a media flow is still actively sending data. If so, the TRP may generate a new keep-alive message towards the endpoint of the media flow. At step 320, a firewall in the path of the media flow intercepts the keep-alive message and updates a value indicating when the pinhole should be closed, e.g., extending a seconds-active field for another 30 seconds).

Figure 4F:
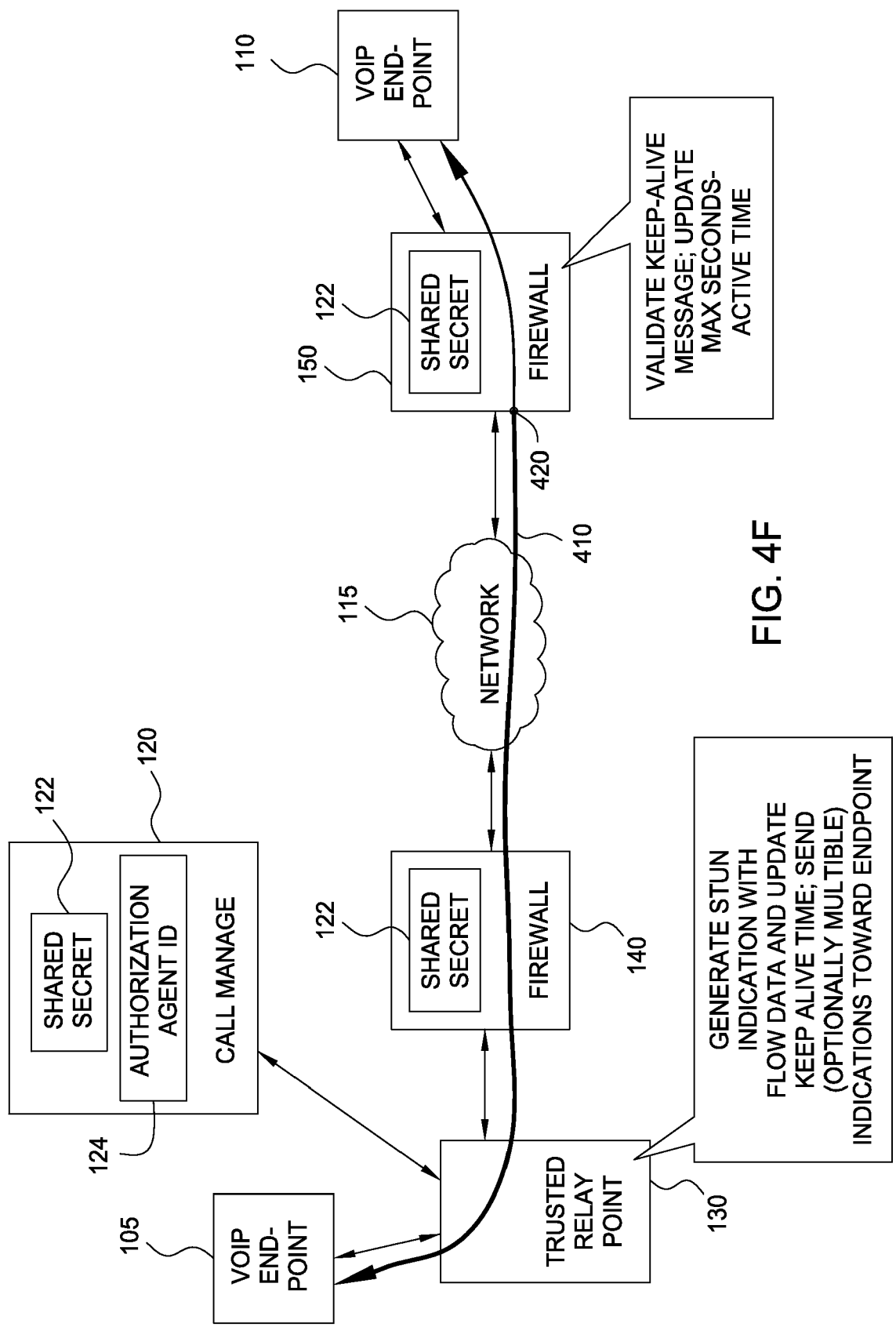
FIGS. 4F-4G illustrate network traffic flow using authentication tokens to sustain a pinhole carrying a media flow using keep-alive messages derived from an authentication token in the example network topology of FIG. 1, according to an embodiment in the present disclosure.

For example, FIG. 4F illustrates the TRP 130 generating a message that includes flow data (indicating source and destination locations and protocol information) and an updated keep-alive time. In one embodiment, the keep-alive message may be encapsulated in a STUN indication. As is known, a STUN indication does not receive a response. Accordingly, in a particular embodiment, multiple STUN indications carrying the keep-alive message may be sent in order to avoid the pinhole being closed due to a dropped packet. Further, the STUN indication(s) may include two fields updated each time the TRP forwards it towards the VoIP endpoint 110. A seconds-active field may specify how many seconds media flow 410 should remain active, from the perspective of the TRP and the pseudo-time of the CAT. And a validation field in the keep-alive message may include a SHA1-HMAC calculated using the seconds-active field and the UHK received from the call controller 120 (as described above). Thus, the keep-alive message can be validated by the firewall—based on the UHK. However, because the TRP does not have the information required to generate the UHK, the call controller 120 remains responsible for authorizing a media flow. At the same time, the call controller 120 delegates authority to the TRP (via the UHK) to keep a pinhole open for the lifetime of the CAT. Note, in one embodiment, rather than send all 128 bits of the SHA1-HMAC, the TRP may send only the first 64 (or 96) bits of the SHA1-MAC.

At step 320, the in-path firewall receives a packet carrying the keep-alive message and determines whether to extend the lifetime of the pinhole. Otherwise, if the firewall does not see (and validate) a keep-alive message for a user-configured interval (e.g., 30 seconds), the pinhole is closed. As shown in FIG. 4F, the firewall 150 receives the STUN message, and in response, determines whether a pinhole 420 is already open. If so, the firewall 150 does not need to validate the CAT (it already did when it created the pinhole). Instead, the firewall 140 validates the keep-alive message. To do so, the firewall 150 determines whether the value of seconds-active field is greater than a previously-received (and previously-validated) message. The firewall 150 then ensures that the seconds-active field does not exceed a maximum CAT duration. Provided the keep-alive message satisfies these two requirements, the firewall 150 then validates the SHA1-HMAC calculated using the seconds-active value and the UHK. If that passes validation, the pinhole is kept open for the additional period, as specified in the seconds-active field of the keep-alive message.

As discussed above, the CAT may be used to authorize a pinhole for a specified period of time. In such cases, if the media flow needs to exist for longer than the specified period, then it needs to be reauthorized with a new CAT. Returning to the method 300 of FIG. 3, at step 325, the TRP determines whether a CAT lifetime is about to expire (i.e., whether the pinhole lifetime cannot be extended using another keep-alive message). If the pinhole lifetime can be extended with another keep-alive message, then the method 300 returns to step 310 where the TRP waits for another keep-alive interval to elapse.

Otherwise, once the CAT is about to expire, at step 330, the TRP sends a request to the call controller to reauthorize the media flow with another CAT. In response, the call controller may generate a new CAT returned to the TRP (step 335). The new CAT may be generated using the same techniques used to generate the original CAT, described above. At step 340, the TRP forwards the new CAT towards the media flow endpoint and the new CAT is intercepted by an in-path firewall. The firewall then resets the maximum lifetime based on information in the new CAT.

Figure 4G:
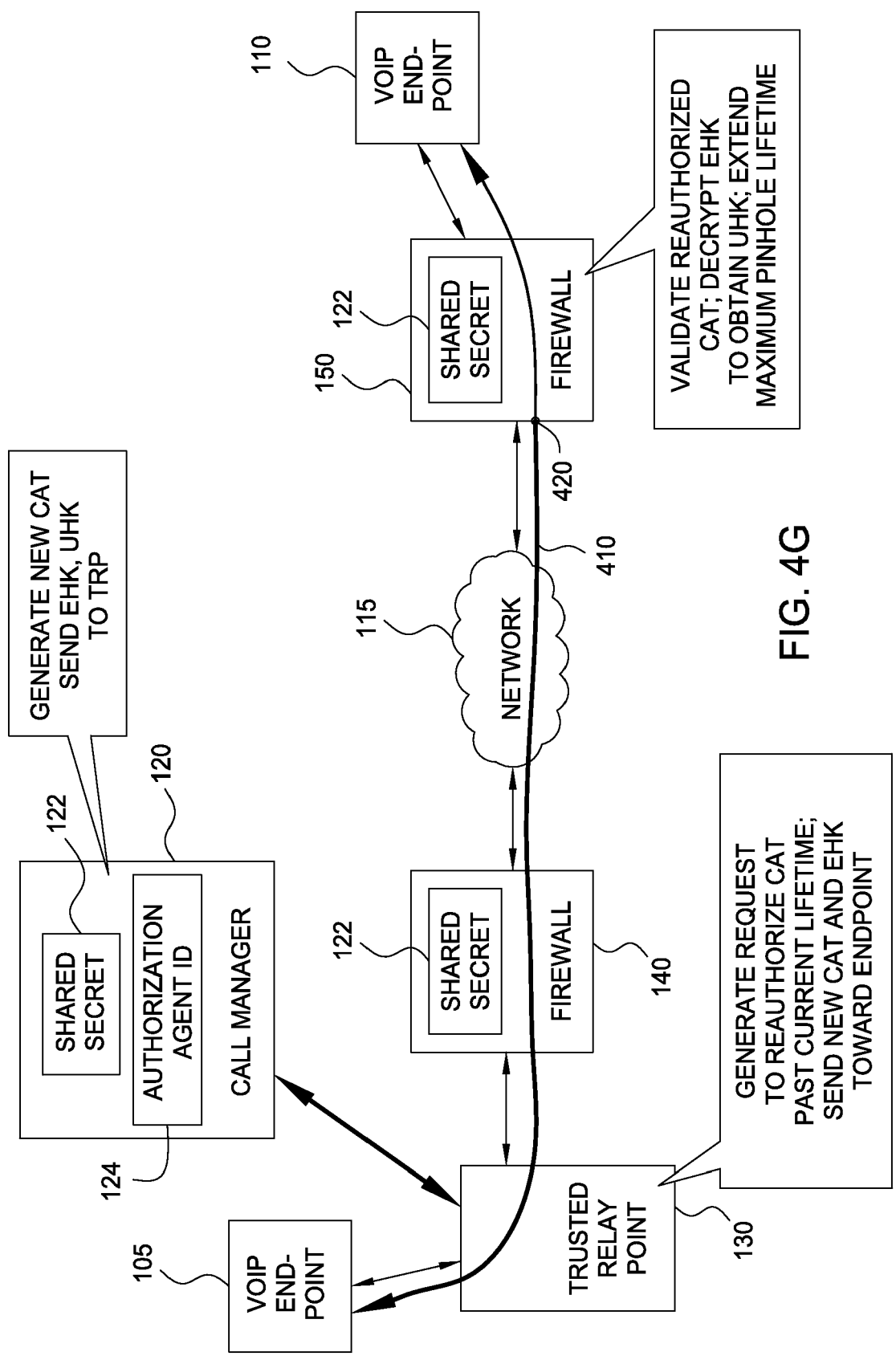

FIG. 4G illustrates an Example of steps 330, 335, and 340 being performed using the example network topology of FIG. 1. As shown, the TRP 130 communicates with the call controller 120 to request a new CAT. In response, the call controller 120 generates a new EHK and UHK values and sends them to the TRP 130. The TRP sends the new EHK and corresponding flow data and towards the firewall 150. Once received, the firewall 150 validates the new CAT as described above (i.e., the firewall decrypts the EHK to obtain a new UHK and updates the maximum pinhole lifetime).

Advantageously, embodiments of the present disclosure describes the use of a token to authorize a firewall to open a pinhole which permits certain network traffic to travel through the firewall, e.g., RTP over UDP used for a real-time media flow such as a VoIP call. An initiating media flow endpoint requests a token from a call controller, which authorizes a pinhole though the firewall. In response, the call controller may generate a cryptographic authorization token (CAT) sent towards the destination endpoint. The call controller may generate the token based on an authorization ID associated with the call controller, a shared secret known to both the call controller and the firewall, and data specific to the media flow for which authorization is requested. A trusted relay point (TRP) may request the token from the call controller and send it toward the VoIP destination endpoint on behalf of the initiating VoIP endpoint. Thus, while the call controller creates the CAT authorizing (and re-authorizing) a pinhole through a firewall, the call controller delegates authority to the TRP to keep a specific pinhole open up to the lifetime of a given CAT. If a call needs to remain active beyond this period, the TRP may request a new CAT from the call controller, prior to the expiration of an initial CAT, and forward it toward the endpoint.

While the foregoing is directed to embodiments of the present disclosure, other and further embodiments of the disclosure may be devised without departing from the basic scope thereof, and the scope thereof is determined by the claims that follow.

The invention claimed is:

1. A system, comprising:
    a network device configured to:
        receive a message used to authorize a media flow which traverses the network device towards a destination endpoint, wherein the message includes a cryptographic authorization token (CAT), flow data describing a source endpoint and the destination endpoint for the media flow, a pseudo-time indicating when the CAT was generated, a keep-alive frequency period, and a CAT lifetime period specified relative to the pseudo-time;

evaluate, by a processor, the CAT to determine whether the CAT was generated by an authorized call controller, wherein the evaluation is based, at least in part, on a shared secret known to both the network device and the authorized call controller; and upon determining that the CAT was generated by the authorized call controller, open a pinhole which allows network traffic from the source endpoint to pass through the network device towards the destination endpoint, wherein the pseudo-time included in the CAT is greater than a different pseudo-time previously observed by the network device, the different pseudo-time being associated with a different CAT previously used to authorize opening a respective pinhole for a different media flow.

2. The system of claim 1, wherein the network device is further configured to require that a keep-alive message be received within each successive keep-alive frequency period after the pinhole is opened in order for the pinhole to continue to remain open, up to the duration of the CAT lifetime period.

3. The system of claim 2, wherein the authorized call controller is configured to delegate authority to generate the keep-alive messages received by the network device to a trusted relay point (TRP).

4. The system of claim 3, wherein the keep-alive messages are transmitted using a 4-tuple composed from information associated with the media flow, including, a source IP address, a source UDP port, a destination IP address, and a destination UDP port.

5. The system of claim 4, wherein the messages are encoded into Session Traversal Utilities for NAT (STUN) messages.

6. The system of claim 1, wherein the call controller authorizes a VoIP call placed from the source endpoint to the destination endpoint.

7. The system of claim 1, wherein the CAT is generated using a keyed hash message authentication code (HMAC) calculated from the flow data describing a source endpoint and a destination endpoint and the shared secret.

8. The system of claim 1, wherein the message received by the network device is on a same 4-tuple as the media flow, wherein the media flow comprises an RTP media stream, and wherein the 4-tuple includes a source IP address, a source UDP port, a destination IP address, and a destination UDP port of the RTP media stream.

9. The system of claim 8, wherein the message comprises a Session Traversal Utilities for NAT (STUN) message.

10. The system of claim 1, wherein the network device acts as a firewall shielding the destination endpoint from network traffic.

11. A method for using authentication tokens to authorize a network device to open a pinhole allowing a media flow to traverse the network device towards a destination endpoint, comprising:

receiving a message used to authorize the media flow which traverses the network device towards the destination endpoint, wherein the message includes a cryptographic authorization token (CAT), flow data describing a source endpoint and the destination endpoint for the media flow, a pseudo-time indicating when the CAT was generated, a keep-alive frequency period, and a CAT lifetime period specified relative to the pseudo-time;

evaluating, by a processor, the CAT to determine whether the CAT was generated by an authorized call controller, wherein the evaluation is based, at least in part, on a shared secret known to both the network device and the authorized call controller; and upon determining that the CAT was generated by the authorized call controller, opening a pinhole which allows network traffic from the source endpoint to pass through the network device towards the destination endpoint, wherein the pseudo-time included in the CAT is greater than a different pseudo-time previously observed by the network device, the different pseudo-time being associated with a different CAT previously used to authorize opening a respective pinhole for a different media flow.

12. The method of claim 11, wherein the network device is configured to require that a keep-alive message be received within each successive keep-alive frequency period after the pinhole is opened in order for the pinhole to continue to remain open, up to the duration of the CAT lifetime period.

13. The method of claim 12, wherein the call controller is configured to delegate authority to generate the keep-alive messages received by the network device to a trusted relay point (TRP).

14. The method of claim 13, wherein the message received by the network device is on a same 4-tuple as the media flow, wherein the media flow comprises an RTP media stream, and wherein the 4-tuple includes a source IP address, a source UDP port, a destination IP address, and a destination UDP port of the RTP media stream.

15. The method of claim 11, wherein the call controller authorizes a VoIP call placed from the source endpoint to the destination endpoint.

16. The method of claim 11, wherein the CAT is generated using a keyed hash message authentication code (HMAC) calculated from the flow data describing a source endpoint and a destination endpoint and the shared secret.

17. The method of claim 11, wherein the network device acts as a firewall shielding the destination endpoint from network traffic.

18. A non-transitory computer-readable storage-medium containing a network program which, when executed on a network device, performs an operation allowing a media flow to traverse the network device towards a destination endpoint, the operation comprising:

receiving a message used to authorize the media flow which traverses the network device towards the destination endpoint, wherein the message includes a cryptographic authorization token (CAT), flow data describing a source endpoint and the destination endpoint for the media flow, a pseudo-time indicating when the CAT was generated, a keep-alive frequency period, and a CAT lifetime period specified relative to the pseudo-time;

evaluating the CAT to determine whether the CAT was generated by an authorized call controller, wherein the evaluation is based, at least in part, on a shared secret known to both the network device and the authorized call controller; and upon determining that the CAT was generated by the authorized call controller, opening a pinhole which allows network traffic from the source endpoint to pass through the network device towards the destination endpoint, wherein the pseudo-time included in the CAT is greater than a different pseudo-time previously observed by the network device, the different pseudo-time being associated with a different CAT previously used to authorize opening a respective pinhole for a different media flow.

19. The non-transitory computer-readable storage-medium of claim 18, wherein the network device is configured to require that a keep-alive message be received within each successive keep-alive frequency period after the pinhole is opened in order for the pinhole to continue to remain open, up to the duration of the CAT lifetime period.

20. The non-transitory computer-readable storage-medium of claim 18, wherein the CAT is generated using a keyed hash message authentication code (HMAC) calculated from the flow data describing a source endpoint and a destination endpoint and the shared secret.

* * * * *